United States Patent
Peterson, Jr.

(10) Patent No.: US 8,095,003 B2
(45) Date of Patent: Jan. 10, 2012

(54) FIBER OPTIC TESTING SYSTEM AND METHOD INCORPORATING GEOLOCATION INFORMATION

(75) Inventor: Daniel L. Peterson, Jr., Sachse, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 777 days.

(21) Appl. No.: 11/614,636

(22) Filed: Dec. 21, 2006

(65) Prior Publication Data

US 2008/0151231 A1 Jun. 26, 2008

(51) Int. Cl.
*H04B 10/08* (2006.01)
*H04B 17/00* (2006.01)

(52) U.S. Cl. ............... 398/21; 398/10; 398/16

(58) Field of Classification Search ............ 398/10, 398/16, 21
See application file for complete search history.

(56) References Cited

U.S. PATENT DOCUMENTS

| | | | |
|---|---|---|---|
| 2005/0226588 A1* | 10/2005 | Pons | 385/135 |
| 2006/0050610 A1* | 3/2006 | Harvey et al. | 367/5 |
| 2007/0264012 A1* | 11/2007 | Healey et al. | 398/13 |

OTHER PUBLICATIONS

MT9080 Series ACCESS Master; Anritsu. Sep. 2004 [online], [retrieved on Jul. 15, 2009] Retrieved from Internet <URL: http://web.archive.org/web/20040914210942/www.anritsu.co.jp/Products/pdf_e/MT9080_EA1100.pdf>.*
Tektronix NetTek OTDR, Data Sheet, 2003, [online], [retrieved on Jan 12, 2010]. Retrieved from the Internet <URL: http://www2.tek.com/cmsreplive/psrep/13343/22W_14289_4_2008.05.15.16.21.47_13343_EN.pdf>.*

\* cited by examiner

*Primary Examiner* — Nathan Curs

(57) ABSTRACT

Systems are provided for gathering location data pertaining to a fiber optic network. One system includes a sensor, a geolocation system, a processor in communication with the sensor and the geolocation system, and a user control panel. The sensor is configured to receive an operational input indicating the condition of a network, and the geolocation system is configured to determine the location, such as a latitude and longitude, of the optical fiber. The processor is configured to associate outputs from the sensor and the geolocation system. The processor may be configured to store the outputs on a storage media. A transmitter may also be provided to transmit the data to a remote location for analysis and display. An associated method for gathering location data is also provided.

14 Claims, 4 Drawing Sheets

FIBER OPTIC TESTING SYSTEM AND METHOD INCORPORATING GEOLOCATION INFORMATION

BACKGROUND

The use of optical fibers for the transmission of data is becoming more and more prevalent in the field of telecommunications. Telephone companies, cable companies, and internet service providers, for example, are continually expanding their fiber optic networks to reach more consumers over a larger geographic area.

Optical fibers have several advantages over traditional metallic communication lines. Optical fiber has the capacity to transmit more data than metallic wires due to greater bandwidths. Optical fiber transmission is also less susceptible to interference from external signals. Due to optical technology developments in the last decade, optical transmission has further un-regenerated reach than traditional electrical transmission.

Optical fibers can be installed in underground or overhead constructions. For example, fiber optic cables may be buried directly in trenches, installed in underground conduits, inserted in paved streets, or inserted into the ground wire for high-voltage power lines. As a result, installed fiber optic cables may be prone to damage in the field from environmental hazards, such as construction work or gnawing animals. In addition, precise location of underground optical fibers and splice points is a significant challenge, and poor location of fiber and fiber splices can be expensive.

When part of an optical network fails due to damaged optical cables, it is essential that the damage can be quickly and accurately located to minimize the duration of the outage and to minimize the cost of repair. In many installations, cables are equipped with location "tones" that carry an electromagnetic signal along a metal conductor within the optical fiber cable. These tones can be detected from above ground and may facilitate the general location of a cable. However, location tones are generally not applicable for fiber splice points. Furthermore, in some older constructions, metallic wires carrying location tones may not have been deployed with the original fiber optic cable, or the metallic wires may have broken connectivity through corrosion or other damage.

In these instances, the location of the optical fibers may be manually sketched or recorded on area maps by the technicians initially installing the cables or subsequently performing maintenance or repair work. Manually recording the location of the cables in this way, however, increases the risk of recording inaccurate or vague location information. For example, a line drawn on a map meant to represent a fiber optic cable may not be drawn in the exact location on the map corresponding to its actual location in the ground.

In engineering new optical systems on older fiber, it is frequently necessary to repair existing splices and other links between fiber optic cables. Technicians called to the field to repair or modify fiber splices generally rely on the manually produced maps to identify the proper location to dig for the cables. Because most underground optical fiber cable is buried adjacent to railroad tracks, digging becomes very expensive due to the large contract crews necessary to flag the railroad and traffic. A failed attempt to locate a fiber optic cable thus results in increased costs due to longer service times as well as the cost of restoring the improperly excavated area. A failed attempt also results in the opportunity to damage other underground equipment that may be buried where the fiber optic cable was thought to be located.

Engineering and planning groups are also responsible for instructing others as to the location of the underground network. For example, a construction crew may need to know the location of communication lines and equipment buried in the vicinity of a construction site in order to avoid damaging the network. Inaccurate location information increases the risk that underground lines will inadvertently be damaged in the course of construction and leads to unnecessary and costly repairs and litigation.

Efforts have been made in the past to more accurately measure and record the location of underground fiber optic cable. One method that has been attempted is to provide every technician with a hand-held global positioning system (GPS) device to obtain precise coordinates corresponding to the location of the technician and, in turn, the fiber optic cable being installed or serviced. The provision of GPS devices to technicians, however, has been found by many in the industry to be an unpractical and cost prohibitive approach to solving the problem of locating underground cables. In addition to the cost associated with the purchase of individual GPS devices for every technician and the inconvenience to the technicians of carrying and maintaining one more piece of equipment, the devices are not simple to operate and require the technicians to undergo additional training. Also, the process of recording the location of the fiber optic cable using a hand-held GPS device still involves action by the technician to obtain coordinates at the correct physical location and to then manually record those coordinates on the proper form. Thus the possibility of human error is still present.

Therefore, there is a need for systems and methods to simply, accurately, and reliably obtain and record the geographic coordinates of underground fiber optic cables and splices in a manner that allows more location information to be recorded, reduces the possibility of error, and provides greater accessibility to the location information associated with different parts of the optical fiber network.

BRIEF DESCRIPTION OF THE SEVERAL VIEWS OF THE DRAWING(S)

DETAILED DESCRIPTION OF PREFERRED EMBODIMENTS

Exemplary embodiments now will be described hereinafter with reference to the accompanying drawings, in which exemplary embodiments and examples are shown. Like numbers refer to like elements throughout.

Figure 1:
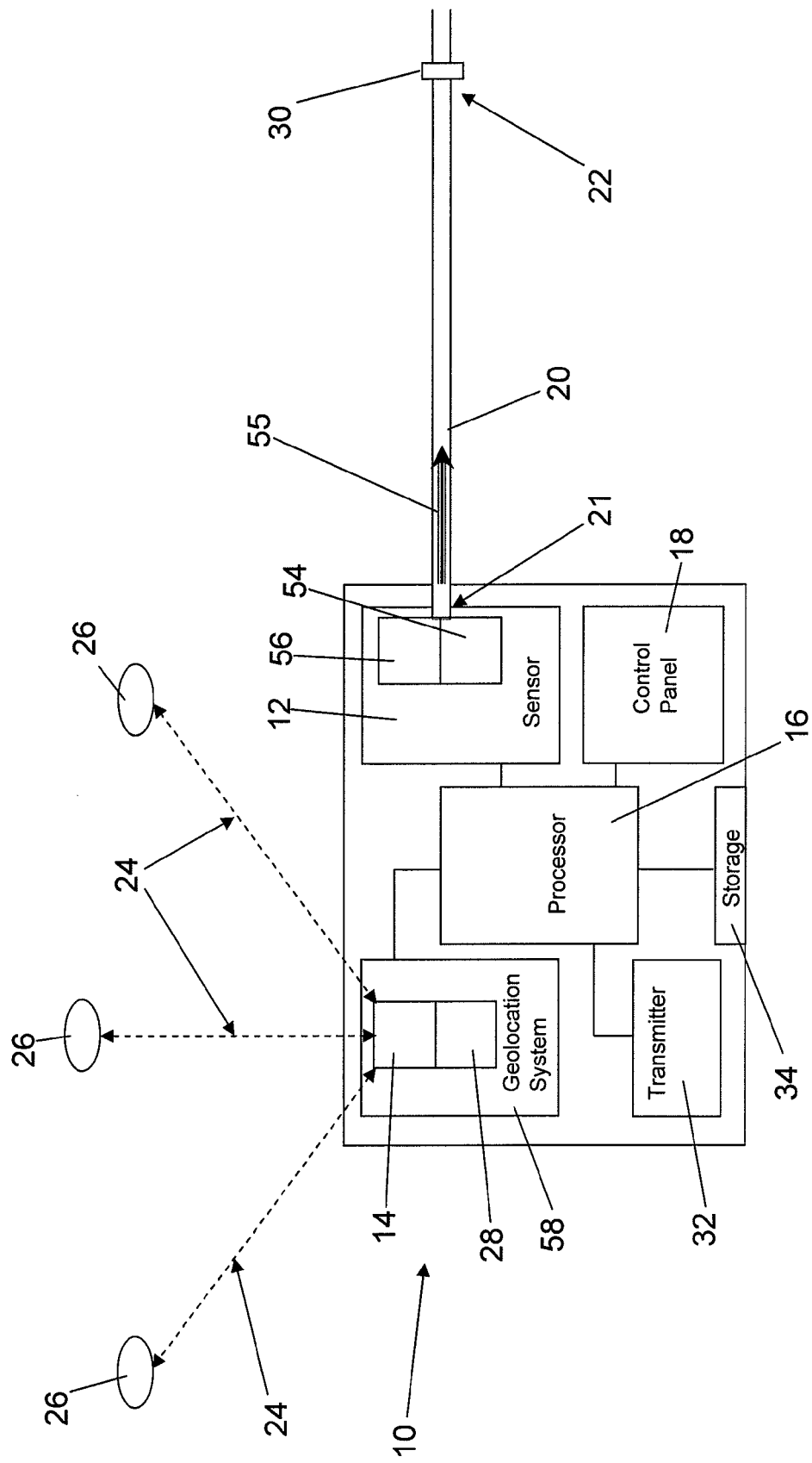
FIG. 1 is a block diagram showing one embodiment of a fiber optic testing system that has a transmitter and storage media.

Systems and methods for gathering location data pertaining to a fiber optic network are provided in accordance with various exemplary embodiments. Referring to FIG. 1, embodiments of the system 10 comprise a sensor 12, a geolocation system 58, a processor 16 in communication with the sensor 12 and the geolocation system 58, and a user control panel 18.

The sensor 12 is configured to receive an operational input indicating the condition of a network. As will be described below, the operational input may be a measurement of light intensity or optical power over an optical fiber. Alternatively, the operational input may be an indication that two fiber optic cable ends have been successfully fused together to form a splice, or an indication that fiber optic cable has been successfully blown into an installation. The operational input may be a measurement or a signal, or the operational input may be the termination or powering off of a device.

The sensor 12 may be positioned at or otherwise be in communication with an end 21, 22 of an optical fiber 20 and may be configured to measure the intensity of a light pulse 55 that has been transmitted from a first end 21 of the fiber optic cable 20 to a second end 22 of the fiber optic cable 20. For example, in the embodiment illustrated in FIGS. 1 and 2, the sensor 12 may be an optical time domain reflectometer (OTDR). Optical time domain reflectometry is a single-ended method of measuring fiber attenuation as a function of distance from the source. A light pulse 55 is coupled into the fiber 20 and transmitted down its length. Both the elapsed time and relative intensity of the backscattered light are measured. In this regard, an OTDR can be positioned at the first end 21 and can include an optical source 54, such as a laser, for emitting the test pulse 55 along the optical fiber 20 in a direction toward the second end 22. Discontinuities or changes in the backscattered light will be generated by breaks, fractures, cracks, or any other stress on the optical fiber 20. The OTDR also includes an optical detector 56 for detecting the backscattered light such that the intensity of the backscattered light and the elapsed time between generation of the test pulse 55 and receipt of the backscattered light can be determined.

Figure 2:
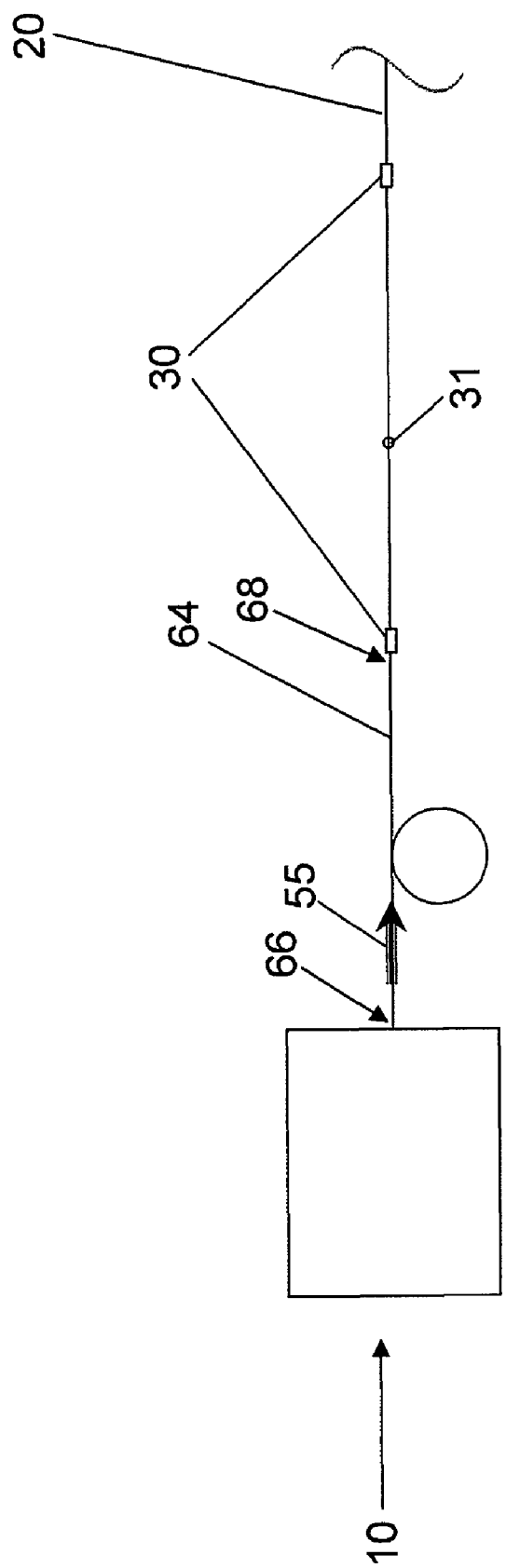
FIG. 2 is a schematic representation of one embodiment of a fiber optic testing system that includes a launch cable.

Although FIGS. 1 and 2 and the discussion focus on a sensor 12 that is an OTDR, it is to be understood that the sensor 12 may be any instrument or device configured to receive an operational input, as previously described. For example, the sensor 12 may be a bi-directional power meter. Bi-directional power meters are double-ended devices with a transmitter/receiver pair on each end of a fiber link. Thus, readings may be obtained for each direction simultaneously to measure optical power or optical power loss over the fiber optic path. In another embodiment, the sensor 12 may be a fiber splicer. Fiber splicers are devices that use a high electric field to fuse two ends of a fiber to splice them together. As another example, the sensor 12 may be a fiber optic cable blower that is used to blow cable into the ground for installation.

Referring again to FIG. 1, the geolocation system 58 is configured to receive a plurality of digital radio signals 24, such as from a remote digital radio signal transmitter or an earth-orbiting satellite 26. For example, the geolocation system 58 may include a geolocation receiver 14 configured to receive a plurality of digital radio signals 24 from at least 3 satellites 26 in orbit around the earth. The geolocation system 58 may also include a chronometer 28 configured to periodically synchronize with an atomic clock disposed in one or more of the satellites 26. A portion of the digital radio signal 24 transmitted from one of the satellites 26 to the geolocation receiver 14 may generally include the time at which the signal was transmitted and the location of the satellite 26. Based on this information, the geolocation system 58 may calculate the distance over which the signal traveled. By considering the distance to three satellites 26, through a process of trilateration, the geolocation system 58 is able to calculate a latitude and longitude of the receiver 14 on the surface of the earth. The geolocation receiver 14 may also be configured to receive a fourth signal from a fourth satellite, enabling the geolocation system 58 to calculate the latitude, longitude, and altitude of the geolocation receiver 14.

The processor 16 of the fiber optic testing system 10 is in communication with the sensor 12 and the geolocation system 58. The processor 16 may be comprised of a microprocessor, a controller, or other computing device configured to perform the functions subscribed herein to the processor 16. The processor 16 is configured to associate one or more outputs from the sensor 12 with outputs from the geolocation system 58. For example, the processor 16 may receive an output from the sensor 12, which may be an OTDR, that is a measure of the power of the backscattered light sensed by the sensor 12. The processor 16 may also receive outputs from the geolocation system 58 that corresponds to a latitude and longitude, and possibly altitude, of the location of the geolocation receiver 14. The processor 16 may then associate the outputs of the sensor 12 and the geolocation system 58, for example by converting the outputs into a binary data string comprising a plurality of discrete data fields, with one field reserved for the output of the sensor 12 and another field reserved for the output of the geolocation system 58. Alternatively, the processor 16 may be configured to interpret raw outputs of the geolocation system 58, such as time, satellite position, satellite velocity, and other variables, to determine a latitude and longitude, and possibly altitude, of the geolocation receiver 14 prior to associating the outputs of the sensor 12 and the geolocation system 58.

The sensor 12 may be configured to receive an operational input representative of one or more anomalies 30, 31 in the fiber optic network. As shown in FIG. 1, for example, the sensor 12 may detect splices 30, connectors, or ends of fiber optic cable 20 based on the intensity of backscattered light produced by the propagation of a test pulse 55 through the fiber 20. Similarly, the sensor 12 may also detect fiber attenuation or damage in or along the fiber optic cable 20.

The processor 16 may be configured to store the outputs from the sensor 12 and from the geolocation system 58 in a location on the system 10. For example, the processor 16 may store a data string associating a sensor 12 output regarding the condition of the network and a geolocation system 58 output regarding the location of the geolocation receiver 14. The outputs, such as the data string, may be stored by the processor 16 onto a portable storage media 34, such as a floppy disk, an optical disc, or a flash memory device, among other storage media. The stored outputs may then be reviewed and analyzed using software and equipment located at a remote location, such as a computer located in a laboratory or office. Alternatively, or in addition to storing the outputs onto a portable storage media 34, the system 10 may include a transmitter 32 configured to transmit the outputs, either wirelessly or via a wired network, to a remote user. In this way, the remote user, who may be located in a laboratory or office miles away, may be able to analyze the outputs without waiting for the field technician to physically bring the data to the remote user.

Figure 3:
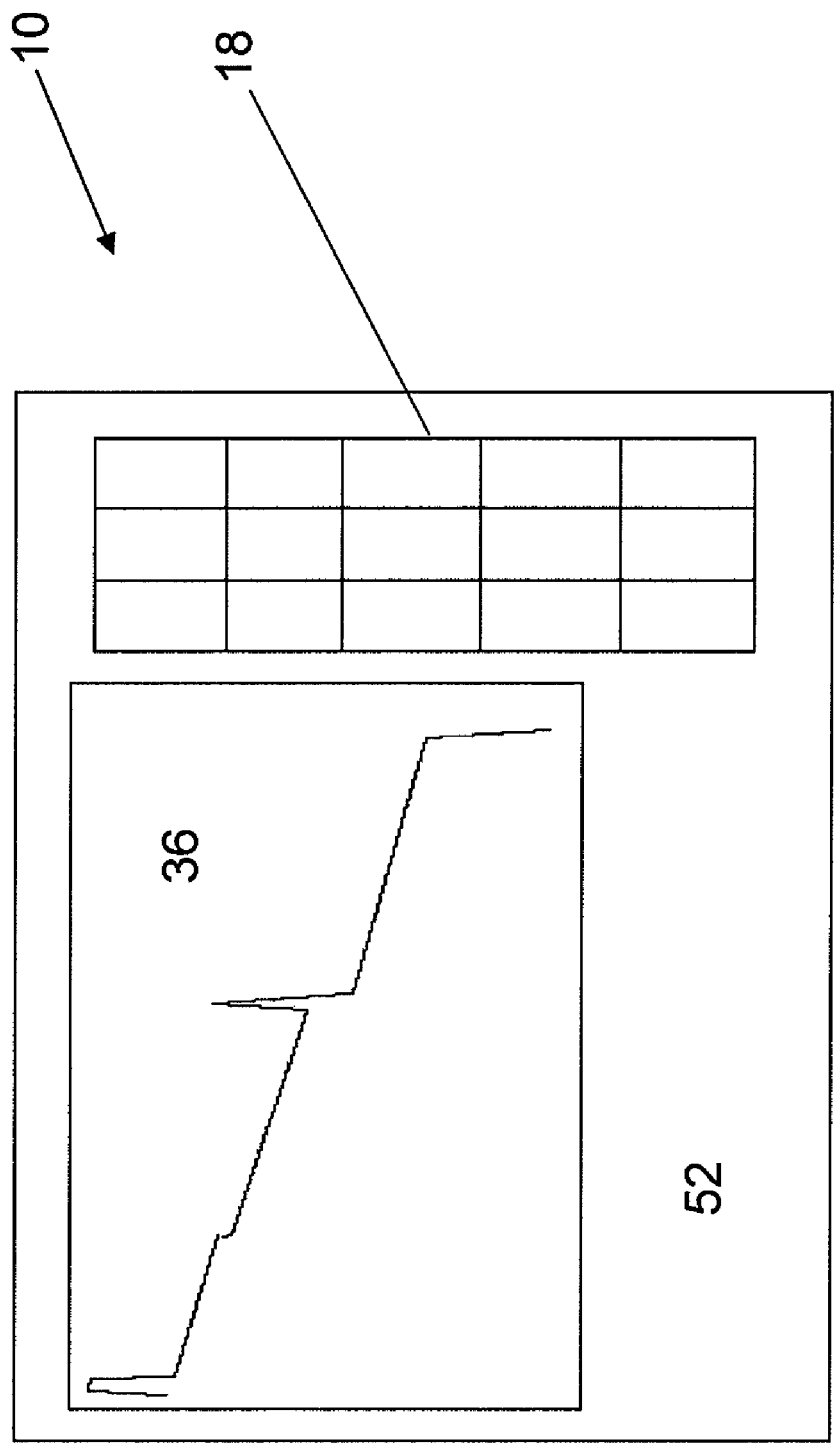
FIG. 3 is a front plan representation of one embodiment of a fiber optic testing system that shows a graphical display and a user control panel.

The user control panel 18 of the fiber optic testing system 10, shown in FIGS. 1 and 3, is configured to convey a set of commands from an operator, such as the fiber optic technician, to the processor 16 for controlling operation of the fiber optic testing system 10. The user control panel 18 may control the sensor 12, the geolocation system 58, both of these components, or any combination of these components and other components of the fiber optic testing system 10, such as the transmitter 32 or storage media 34. For example, the technician may use the control panel 18 to command the sensor 12 to propagate a test pulse 55 having a predetermined wavelength, such as 1310 nm, and a predetermined puslewidth, such as 300 ns, through the optical fiber 20 and to measure the intensity of and time delay associated with the reflected light resulting from the test pulse 55. The technician may also use the control panel 18 to command the geolocation receiver 14 to obtain location data, or the geolocation system 58 may be configured (or may be driven by the processor) to automatically obtain location data each time that a test pulse 55 is emitted without requiring user input. Some embodiments of the fiber optic testing system 10 may include a graphical display 36 configured to present the outputs of the sensor 12 and geolocation system 58 in textual or graphical form. In such embodiments, the technician may use the control panel 18 to command the graphical display 36 to display these outputs, as well.

In other embodiments, a fiber optic testing system 10 is provided, embodiments of which are represented in FIGS. 1, 2 and 3. Referring to FIGS. 1 and 3, the fiber optic testing system 10 comprises a housing 52, an optical source 54 and an optical detector 56 within the housing 52, a geolocation system 58, and a processor 16. The optical source 54 is configured to emit a series of light test pulses 55 through an optical fiber 20 to be analyzed, and the optical detector 56 is configured to receive backscattered light from a plurality of locations along the optical fiber 20. The optical detector 56 is also configured to measure at least one predetermined characteristic of the backscattered light, wherein variations in measurements correlate to anomalies 30, 31 (shown in FIG. 2) in the optical fiber 20. For example, the optical detector 56 may be configured to measure the intensity of the backscattered light, and variations in the intensity may correlate to splices 30, connectors, damage 31, or other anomalies in the optical fiber 20. Similarly, the optical detector 56 may be configured to measure the spectral profile of the backscattered light over a certain wavelength range to determine transmission quality and identify points of signal power loss in the optical fiber 20.

The geolocation system 58 of the fiber optic testing system 10 may be disposed inside the housing 52, as shown in FIG. 1, or connected to the housing 52 externally such that the geolocation system 58 is in communication with at least the processor 16. The geolocation system 58 includes a receiver 14 configured to receive a plurality of satellite signals and also includes a chronometer 28 configured to periodically synchronize with an atomic clock on at least one of the satellites 26. The processor 16 is configured to calculate predetermined optical values based on a set of data from the optical source 54 and the optical detector 56. For example, the processor 16 may be configured to calculate the proportion of the power of the test pulses 55 generated by the optical source 54 to the power of the backscattered light measured by the optical detector 56. The processor 16 is also configured to process data from the geolocation system 58 to produce a location value, corresponding to a latitude and a longitude of the location of the testing system 10 on the earth, and to associate the optical values and the location value, for example by converting the optical values and the location value into a binary data string comprising a plurality of discrete data fields.

The housing 52 of the fiber optic testing system 10 supports a graphical display 36 and a user control panel 18, illustrated in FIG. 3. The user control panel 18 is configured to receive commands from a user, such as the technician operating the fiber optic testing system 10, and to at least partially control one or more functions of the fiber optic testing system 10, including the graphical display 36, the optical source 54, the optical detector 56, the geolocation system 58, and/or the processor 16. For example, the technician may command the user control panel 18 to display only certain parameters on the graphical display 36, such as the intensity of the backscattered light with respect to distance along the optical fiber 20. Likewise, the technician may use the control panel 18 to control the wavelength and frequency of the light test pulses 55 emitted by the optical source 54, or to command the optical detector 56 to measure certain parameters of the backscattered light, such as intensity or wavelength. The user control panel 18 may also be used to command the geolocation system 58 to determine the location of the fiber optic testing system 10 based on signals received from a plurality of satellites 26, as well as to at least partially govern operations of the processor 16.

Referring to FIG. 1, the processor 16 may be configured to store the optical values and the associated location value determined by the processor 16 onto a storage media. The storage media may be, for example, memory integral to the fiber optic testing system 10, or a portable storage media 34 such as a floppy disk, an optical disc, or a flash memory device. The fiber optic testing system 10 may, in addition to or instead of the portable storage media 34, include a transmitter 32 within the housing 52 configured to transmit the data, either wirelessly or via a wired network, to a remote location.

The fiber optic testing system 10 may comprise a launch cable 64 having a first end 66 and a second end 68, shown in FIG. 2. the first end 66 may be in communication with the fiber optic testing system 10, and, more particularly, in optical communication with the optical source 54 (shown in FIG. 1). The second end 68 may be in communication with an end of the optical fiber 20 to be analyzed. The launch cable 64 is configured to permit the propagation of the test pulses 55 from the optical source 54 to the optical fiber 20 in a way that allows the test pulses 55 to equilibrate within the launch cable 64 prior to entering the optical fiber 20. In other words, the backscattered light is typically so "bright" at the beginning of the transmission that it "blinds" the optical detector 56 from detecting anomalies at the beginning of the fiber 20. Thus, the launch cable 64 allows the "bright" reflections to die down enough to allow analysis of the beginning of the fiber 20. The launch cable 64 is also configured to permit the propagation of backscattered light produced by the test pulses 55 from a plurality of locations along the optical fiber 20, such as splices 30 and damaged sections 31 shown in FIG. 2, to the optical detector 56. In this way, the launch cable 64 may be configured to allow a more accurate analysis of the condition of the optical fiber 20 to be tested.

Figure 4:
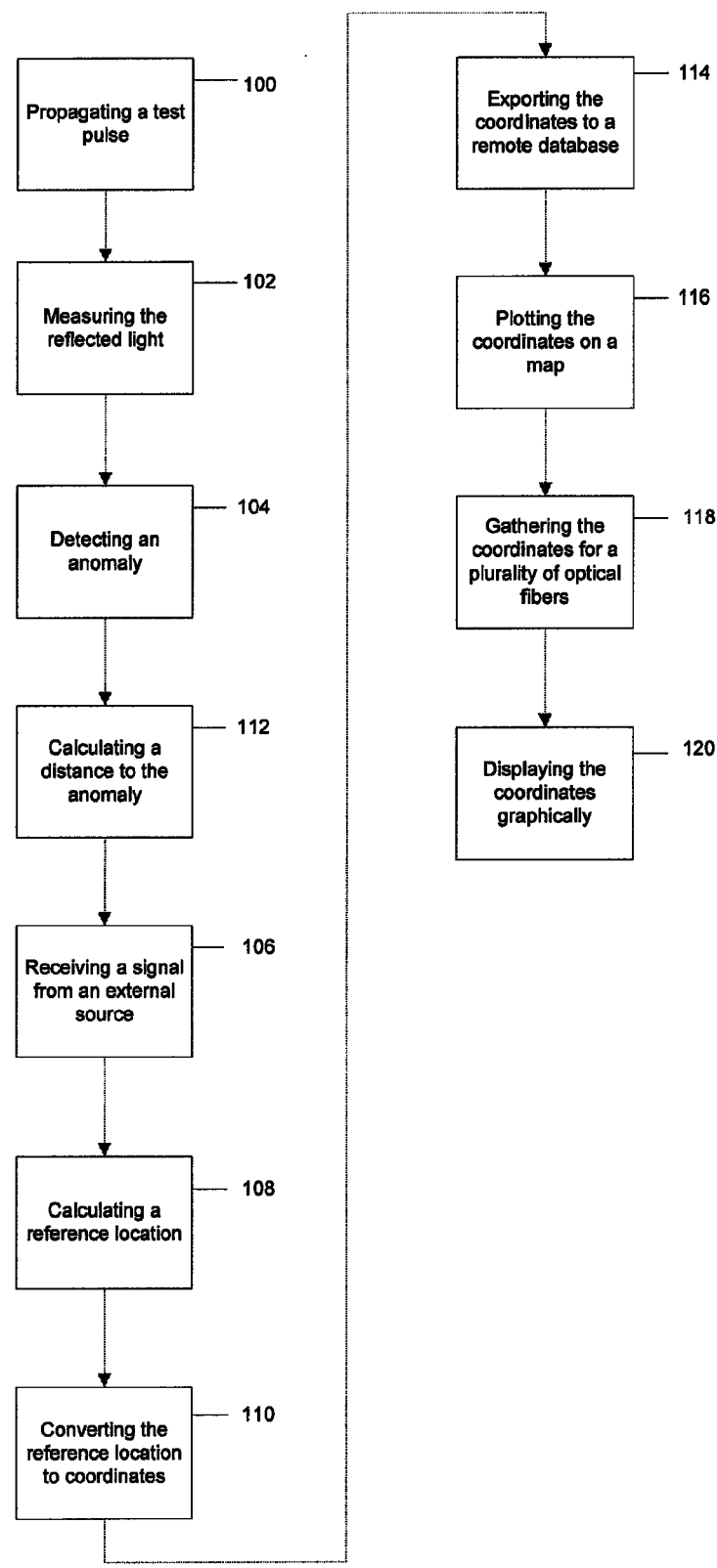
FIG. 4 is a flow diagram illustrating embodiments of a method of gathering location data pertaining to a fiber optic network.

In other embodiments, a method of gathering location data pertaining to a fiber optic network is provided. Referring to FIG. 4, embodiments of the method initially propagate a test pulse through an optical fiber, measure the intensity of and time delay associated with light reflected as a result of the test pulse, and detect at least one anomaly, such as a splice or connector. See FIG. 4, blocks 100-104. Embodiments of the method also receive at least one digital radio signal from at least one external source, such as an earth-orbiting satellite, at a location close to a source of the test pulse, for example at a fiber optic testing system housing an optical source. See block 106. Although FIG. 4 shows one or more signals being received subsequent to propagating a test pulse, measuring the intensity of and time delay associated with the reflected light, and detecting anomalies, the signal may be received before or simultaneously with any of these steps or other additional intervening steps. See blocks 100-106. Based upon the digital radio signals, a reference location value, typically the location of the geolocation system, is determined. This reference location value may be expressed as a set of coordinates including a latitude component and a longitude component. See blocks 108-110.

The method of gathering location data may also include calculating a distance to one or more anomalies present in the optical fiber being analyzed. See block 112. For example, the processor of a fiber optic testing system may consider the speed at which a test pulse was propagated through the optical fiber, generally the speed of light in the optical fiber medium, and the elapsed time based upon the difference between the time at which the test pulse exited an optical source and entered the optical fiber, and the time at which the test pulse was received at an optical detector located proximate the optical source. Accounting for two-way travel through the optical fiber by dividing the total travel time T by 2, the distance D of the detected anomalies may be calculated using the equation $D=(V \times T)/2$.

The method may further include exporting the set or sets of coordinates to a remote database and plotting the coordinates on a map to visually display the geographic location of the optical fiber and/or fiber splices. See blocks 114-116. For example, the coordinates of the optical fiber at the point being tested may be converted to a binary data string and associated with other data obtained by the testing of the optical fiber, such as data regarding the condition of the network. The data may then be transmitted, such as through storage on a portable storage media or through wireless transmission over a packet-switching network, to a remote database, such as a database located on a remote server. Software running at the remote location may extract the location information from the binary data string and plot the coordinates of the optical fiber on a map, such as a map showing streets, railroad tracks, and other identifying landmarks. The location of splices and other connectors may also be exported and plotted in this manner.

The coordinates corresponding to the location of a plurality of optical fibers and/or splices may similarly be gathered and displayed graphically on a map. See blocks 118-120. For example, over the course of analyzing the condition of optical fibers at different locations in a network, the respective coordinates may be transmitted to a central database, compiled, and displayed on a map of the region. An operator viewing the map may thus be able to see the location of a fiber optic network and associated splices and connections with respect to visual landmarks and other branches of the network. In this way, the report of a failure in a portion of the network may be remotely analyzed to isolate the suspect optical fibers that may be the cause of the failure. Engineers and technicians sent to the field to trouble shoot and repair the problem may then use the visual representation along with the associated location data to locate relevant portions of the network and perform the necessary repairs. In the same way, engineers and technicians may be able to instruct others, such as construction workers, as to the location of nearby underground optical fibers to prevent inadvertent damage to and destruction of the fiber optic network during excavation.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A fiber optic testing system comprising:
   a bi-directional power meter configured to receive an operational input indicating a condition of a network;
   a geolocation system, co-located with said bi-directional power meter, said geolocation system configured to receive a plurality of digital radio signals;
   a processor in communication with the bi-directional power meter and the geolocation system, the processor being configured to associate outputs from the bi-directional power meter with outputs from the geolocation system; and
   a user control panel configured to convey a set of commands from an operator to the processor for control of at least the bi-directional power meter or the geolocation system;
   wherein said geolocation system is configured to automatically obtain location data each time one of said outputs is emitted from said meter.

2. The fiber optic testing system of claim 1 wherein the bi-directional power meter is configured to measure the intensity of a light pulse that has been transmitted from a first end of a fiber optic cable to a second end of the fiber optic cable, the bi-directional power meter being positioned at one end of the fiber optic cable.

3. The fiber optic testing system of claim 1 wherein the bi-directional power meter is configured to measure the optical power of a light pulse that has been transmitted from a first end of a fiber optic cable to a second end of the fiber optic cable, the bi-directional power meter being positioned at one end of the fiber optic cable.

4. The fiber optic testing system of claim 1 wherein the geolocation system comprises:
   a geolocation receiver configured to receive a plurality of digital radio signals from at least 3 satellites in orbit around the earth; and
   a chronometer configured to periodically synchronize with an atomic clock disposed in at least one of the at least 3 satellites.

5. The fiber optic testing system of claim 1 wherein the processor manipulates the output of the geolocation system to calculate a value corresponding to a location of the optical fiber on the earth.

6. The fiber optic testing system of claim 1 wherein the bi-directional power meter receives an operational input detecting at least one anomaly in the network.

7. The fiber optic testing system of claim 1 wherein the processor is configured to store the outputs from the bi-directional power meter and from the geolocation system.

8. The fiber optic testing system of claim 1 further comprising a transmitter configured to transmit the outputs over a network to a remote user.

9. The fiber optic testing system of claim 1 further comprising a graphical display configured to present at least one output in graphical form.

10. A fiber optic testing system comprising:
    a housing supporting a graphical display and a user control panel;
    an optical bi-directional power meter configured to emit a series of light test pulses through an optical fiber to be analyzed and to measure optical power or optical power loss over a fiber optic path of said optical fiber;
    a geolocation system within said housing, said geolocation system including a receiver configured to receive a plurality of satellite signals and including a chronometer configured to periodically synchronize with an atomic clock on at least one satellite; and
    a processor configured to calculate predetermined optical values based on a set of optical data from the optical bi-directional power meter, to process data related at least to said satellite signals from the geolocation system to produce a location value, wherein the location value corresponds to a latitude and a longitude of the location of the testing system on the earth, and to associate the optical values and the location value;

wherein said geolocation system is configured to automatically obtain said data related at least to said satellite signals each time one of said light test pulses is emitted from said meter.

11. The fiber optic testing system of claim 10 wherein the processor is further configured to store the optical values and the location value from the processor onto a storage media.

12. The fiber optic testing system of claim 10 wherein the user control panel is configured to receive commands from a user and at least partially control at least one of the graphical display, the optical bi-directional power meter, the geolocation system, and the processor.

13. The fiber optic testing system of claim 10 further comprising a transmitter within the housing configured to transmit the optical values and the location value from the processor to a remote location.

14. The fiber optic testing system of claim 10 further comprising a launch cable having a first end in communication with the testing system and a second end in communication with the optical fiber, wherein the launch cable is configured to allow the test pulses emitted by the optical bi-directional power meter to equilibrate within the launch cable prior to reaching the optical fiber.

* * * * *